(12) United States Patent
Fujiwara

(10) Patent No.: US 7,505,290 B2
(45) Date of Patent: Mar. 17, 2009

(54) POWER SUPPLY APPARATUS INCLUDING CHARGE-PUMP TYPE STEP-UP CIRCUIT HAVING DIFFERENT DISCHARGING TIME CONSTANTS

(75) Inventor: Hirofumi Fujiwara, Ohtsu (JP)

(73) Assignee: NEC Electronics Corporation, Kanagawa (JP)

( * ) Notice: Subject to any disclaimer, the term of this patent is extended or adjusted under 35 U.S.C. 154(b) by 80 days.

(21) Appl. No.: 11/480,458

(22) Filed: Jul. 5, 2006

(65) Prior Publication Data

US 2008/0007980 A1    Jan. 10, 2008

(30) Foreign Application Priority Data

Jul. 5, 2005    (JP) .............................. 2005-196376

(51) Int. Cl.
    *H02M 3/18* (2006.01)
(52) U.S. Cl. ........................................ 363/60
(58) Field of Classification Search ................... 363/59, 363/60, 123; 327/536, 148, 157
    See application file for complete search history.

(56) References Cited

U.S. PATENT DOCUMENTS

2002/0154524 A1* 10/2002 Yamanaka et al. ............ 363/59
2005/0189983 A1*  9/2005 Sivero et al. ................. 327/536

FOREIGN PATENT DOCUMENTS

JP        2005-20971        1/2005

* cited by examiner

*Primary Examiner*—Shawn Riley
(74) *Attorney, Agent, or Firm*—Young & Thompson

(57) ABSTRACT

In a power supply apparatus, a charge-pump type step-up circuit is adapted to charge a step-up capacitor by a power supply voltage, step up a charged voltage of the step-up capacitor using a charge-pump operation, and discharge a stepped-up voltage to a smoothing capacitor. A regulator has a first comparator adapted to compare a voltage corresponding to an output voltage of the step-up circuit with a reference voltage to generate a comparison output signal and skip a clock signal in accordance with the comparison output signal, so that the output voltage of the step-up circuit is brought close to a target voltage. Discharging of the smoothing capacitor is carried out through a resistor with a predetermined time constant when the output voltage of the step-up circuit is between the target voltage and a voltage lower than the target voltage by a predetermined value.

14 Claims, 9 Drawing Sheets

POWER SUPPLY APPARATUS INCLUDING CHARGE-PUMP TYPE STEP-UP CIRCUIT HAVING DIFFERENT DISCHARGING TIME CONSTANTS

BACKGROUND OF THE INVENTION

1. Field of the Invention

The present invention relates to a power supply apparatus including a charge-pump type step-up circuit and a regulator for regulating the output voltage of the charge-pump type step-up circuit.

2. Description of the Related Art

A typical power supply apparatus suitably used in a driver for driving a display panel such as a liquid crystal display (LCD) panel of a mobile phone or a personal digital assistant (PDA) includes a charge-pump type step-up circuit and a regulator for regulating the output voltage of the charge-pump type step-up circuit.

A prior art power supply apparatus is constructed by a charge-pump type step-up circuit having a single discharging (step-up) time constant of a smoothing capacitor, and a regulator formed by a voltage divider for dividing the output voltage of the step-up circuit to generate a divided voltage, a comparator for comparing the divided voltage with a reference voltage to generate a comparison output signal, and an AND circuit for supplying a clock signal to the step-up circuit in accordance with the comparison output signal (see: JP-2005-20971A). This will be explained later in detail.

SUMMARY OF THE INVENTION

In the above-described prior art power supply apparatus, however, when a driven load is relatively small and the response characteristics of the comparator are relatively high, the power consumption would be remarkably increased.

In order to decrease the power consumption, the response characteristics of the comparator are decreased or the comparator is a hysteresis-type comparator, by which large overshoots would be generated, which would deteriorate the elements of the apparatus. Also, the ripple of the output voltage of the step-up circuit would be increased.

According to the present invention, in a power supply apparatus, a charge-pump type step-up circuit is adapted to charge a step-up capacitor by a power supply voltage, step up a charged voltage of the step-up capacitor using a charge-pump operation, and discharge a stepped-up voltage to a smoothing capacitor. A regulator has a first comparator adapted to compare a voltage corresponding to an output voltage of the step-up circuit with a reference voltage to generate a comparison output signal and skip a clock signal in accordance with the comparison output signal, so that the output voltage of the step-up circuit is brought close to a target voltage. Discharging of the smoothing capacitor is carried out through a resistor with a predetermined time constant when the output voltage of the step-up circuit is between the target voltage and a voltage lower than the target voltage by a predetermined value.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENT

Figure 3:
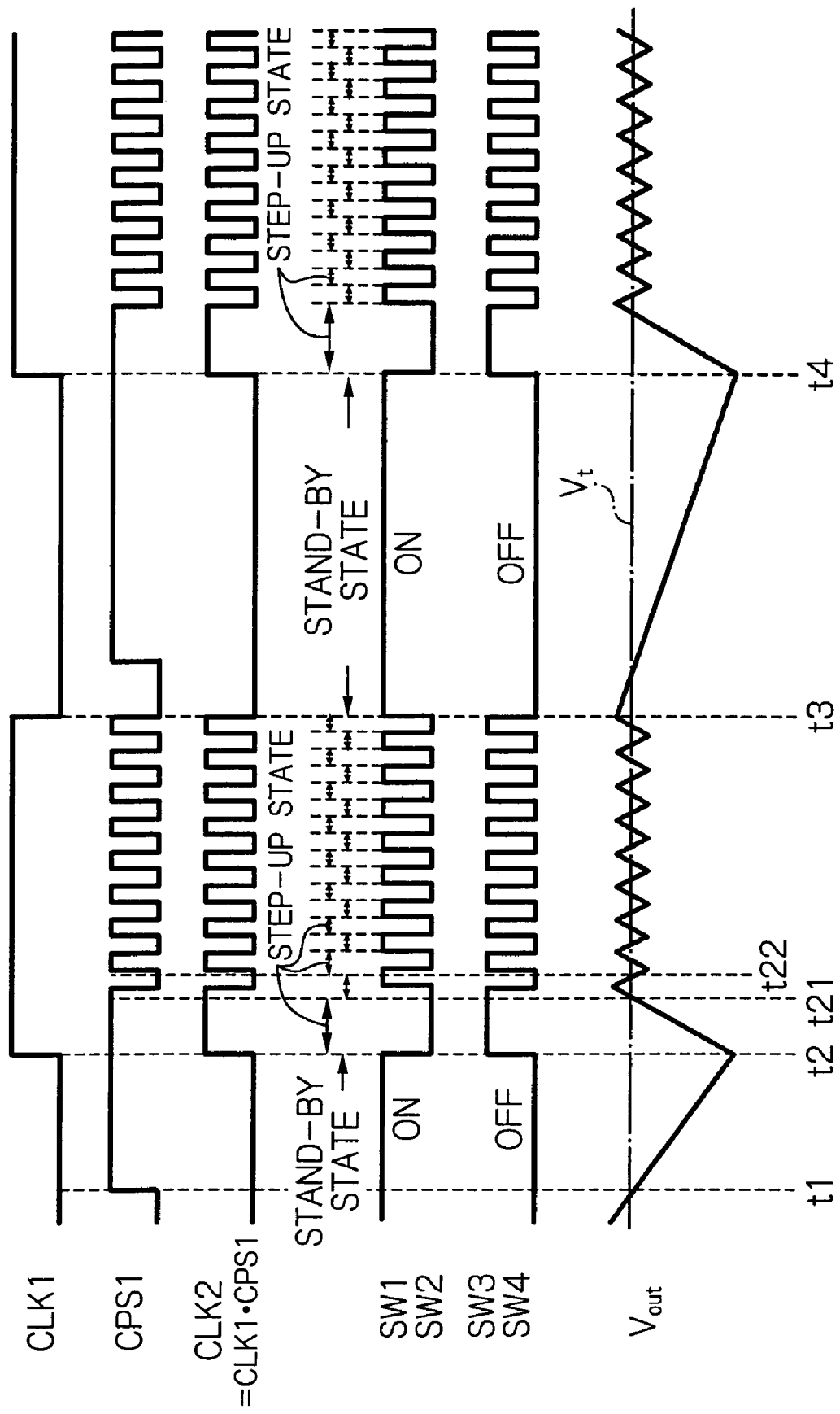
FIG. 3 is a timing diagram for explaining a second operation of the power supply apparatus of FIG. 1.
Figure 4:
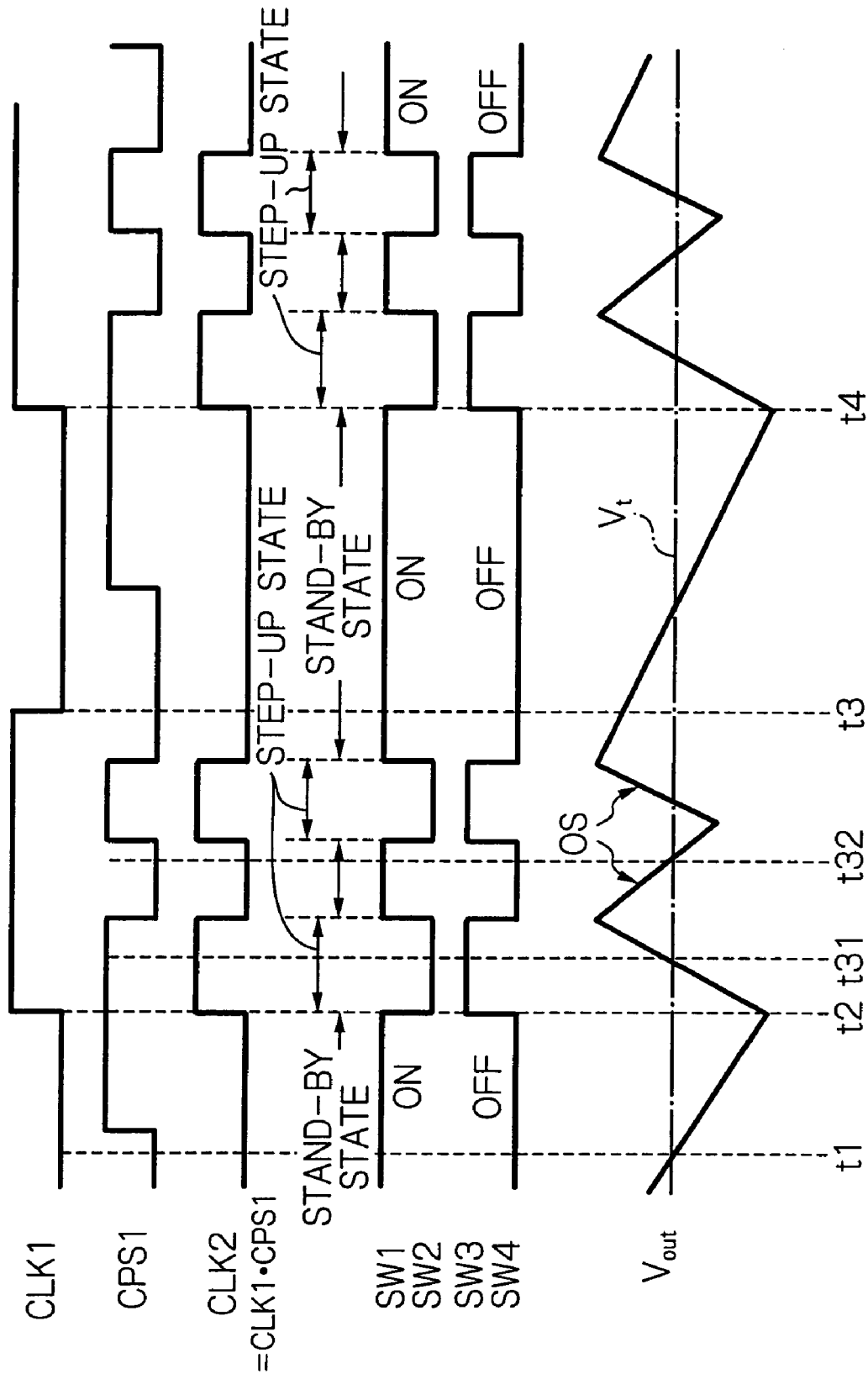
FIG. 4 is a timing diagram for explaining a third operation of the power supply apparatus of FIG. 1.
Figure 5:
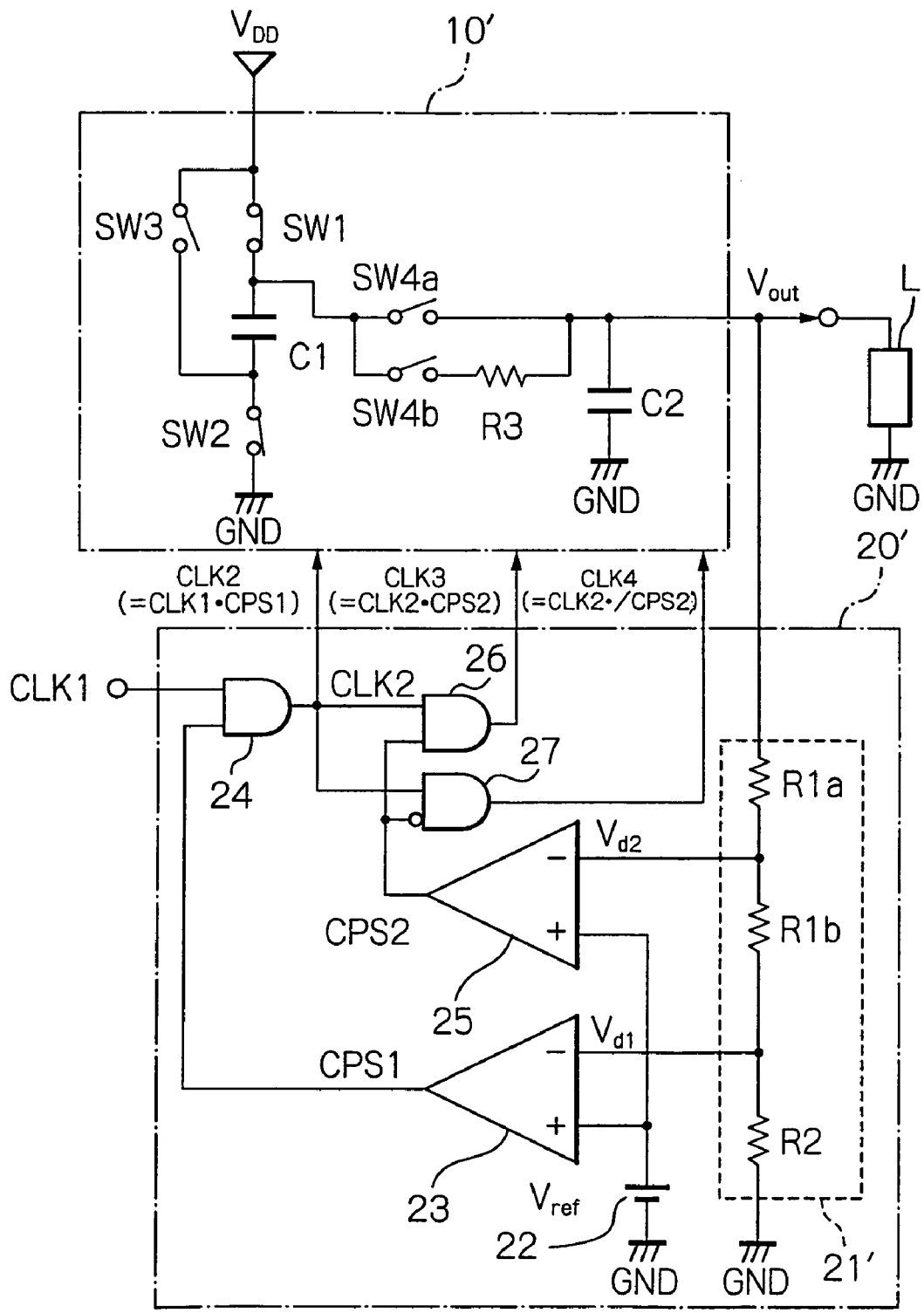
FIG. 5 is a circuit diagram illustrating an embodiment of the power supply apparatus according to the present invention.

Before the description of the preferred embodiment, a prior art power supply apparatus will be explained with reference to FIGS. 1, 2, 3 and 4 (see: FIGS. 3, 4 and 5 of JP-2005-20971 A).

Figure 1:
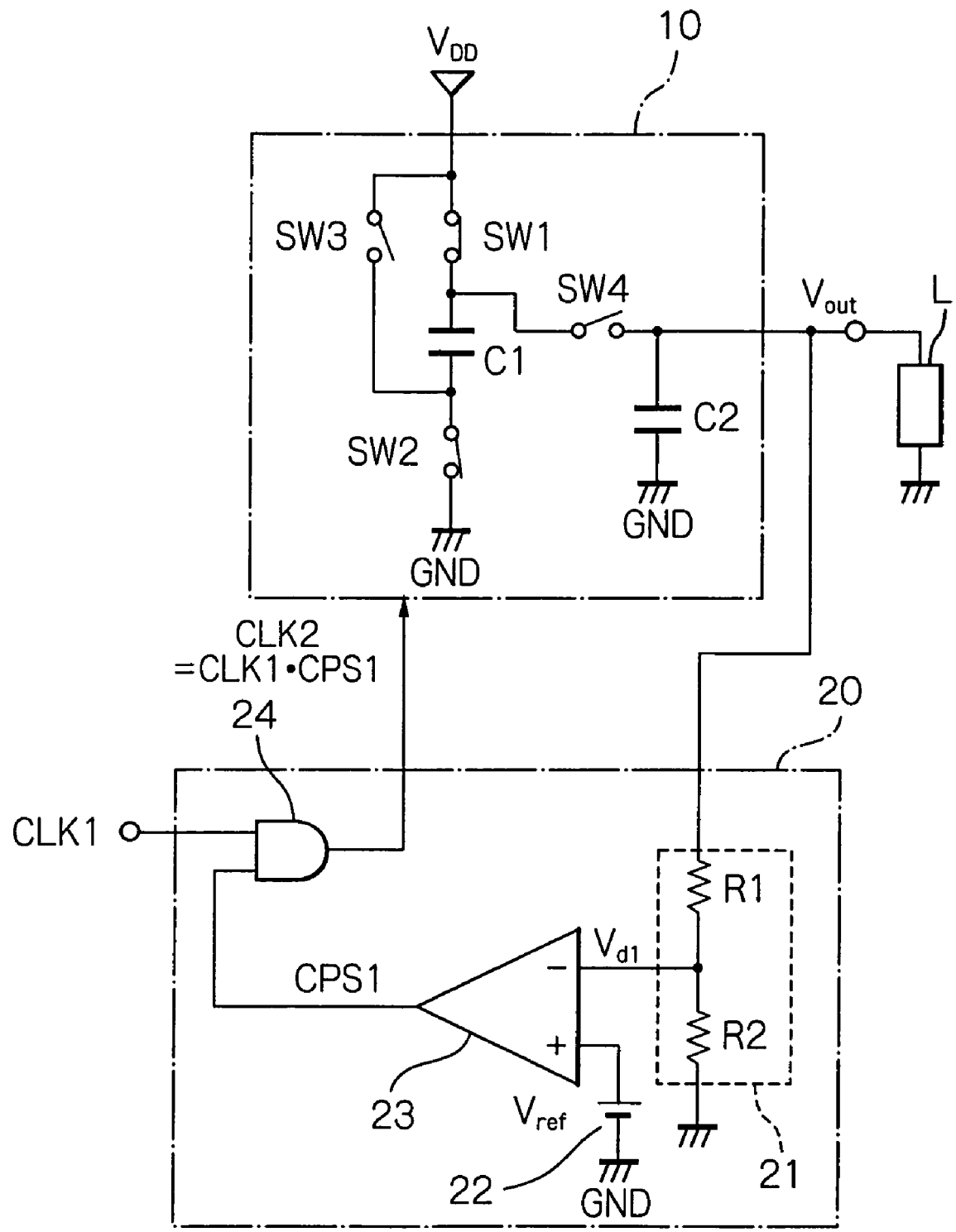
FIG. 1 is a circuit diagram illustrating a prior art power supply apparatus.

In FIG. 1, a prior art power supply apparatus is constructed by a step-up circuit 10 for stepping up a power supply voltage $V_{DD}$ as an input voltage in accordance with a skipped clock signal CLK2 of a clock signal CLK1 to generate a stepped-up voltage, i.e., an output voltage $V_{out}$, and a regulator 20 for regulating the output voltage $V_{out}$ of the step-up circuit 10 to a target voltage $V_t$. In this case, the regulator 20 skips the clock signal CLK1 in accordance with the output voltage $V_{out}$ of the step-up circuit 10 to generate the clock signal CLK2 and transmit it to the step-up circuit 10.

The charge pump circuit 10 is constructed by four switches SW1, SW2, SW3 and SW4, a step-up capacitor C1 and a smoothing capacitor C2. In this case, the set of the switches SW1 and SW2 as charging switching elements and the set of the switches SW3 and SW4 as discharging switching elements are complementarily turned ON and OFF by the clock signal CLK2. That is, a stand-by state where CLK2="0" (low level), the switches SW1 and SW2 are turned ON while the switches SW3 and SW4 are turned OFF, so that the step-up capacitor C1 is charged by a power supply voltage $V_{DD}$. On the other hand, in a step-up state where CLK2="1" (high level), the switches SW1 and SW2 are turned OFF while the switches SW3 and SW4 are turned ON, so that the power supply voltage $V_{DD}$ is superposed onto the charged voltage of the step-up capacitor C1. Thus, the stand-by state and the step-up state are alternately repeated, so that a voltage at the smoothing capacitor C2 becomes higher than the power supply voltage $V_{DD}$.

If duration periods of the stand-by state and the step-up state are long enough to charge the step-up capacitor C1 and the smoothing capacitor C2, respectively, at their saturation states, the output voltage $V_{out}$ of the step-up circuit 10 would become a voltage of $2 \cdot V_{DD}$. Conversely, if the duration period of the stand-by state and the step-up state is insufficient to charge the step-up capacitor C1 and the smoothing capacitor C2, respectively, at their non-saturation states, the output voltage $V_{out}$ of the step-up circuit 10 would become smaller than $2 \cdot V_{DD}$. That is, the regulator 20 is provided to make the output voltage $V_{out}$ of the step-up circuit 10 to be a target voltage $V_t$ which satisfies the following:

$$V_t \leq 2 \cdot V_{DD}$$

The regulator 20 is constructed by a voltage divider 21 for generating a divided voltage $V_{d1}$ of the output voltage $V_{out}$ of the step-up circuit 10, a reference voltage source 22 for generating a reference voltage $V_{ref}$, a comparator 23 for comparing the divided voltage $V_{d1}$ of the voltage divider 21 with the reference voltage $V_{ref}$ to generate a comparison output signal CPS1, and an AND circuit 24 for passing a clock signal CLK1 therethrough as the clock signal CLK2 in accordance with the comparison output signal CPS1. That is, $$CLK2=CLK1 \cdot CPS1$$

Also, the divided voltage $V_{d1}$ is represented by $$V_{d1}=V_{out} \cdot R2/(R1+R2)$$

Therefore, the regulator 20 regulates the output voltage $V_{out}$ of the step-up circuit 10 so that the output voltage $V_{out}$ is brought close to the target voltage $V_t$ represented by $$V_t=V_{ref}(R1+R2)/R2 \leq 2V_{DD}$$

Thus, the target voltage $V_t$ can be set by adjusting one or more of the reference voltage $V_{ref}$ and the resistors R1 and R2.

In other words, the comparator 23 substantially compares the output voltage $V_{out}$ of the step-up circuit 10 with the target voltage $V_t$, to generate the comparison output signal CPS1. That is, if $V_{out} \leq V_t$, CPS1="1" (high level). On the other hand, if $V_{out} > V_t$, CPS1="0" (low level).

A first operation of the power supply apparatus of FIG. 1 is explained next with reference to FIG. 2 where a load L to which the output voltage $V_{out}$ is applied is relatively large.

First, at time t1, the clock signal CLK1 is low so that the clock signal CLK2 is also low. Therefore, the step-up circuit 10 is in a stand-by state where the switches SW1 and SW2 are turned ON and the switches SW3 and SW4 are turned OFF.

Next, at time t2, since $V_{out} < V_t$, the comparison output signal CPS1 of the comparator 23 is "1" (high level), so that CLK2=CLK1. Therefore, when the clock signal CLK1 is switched from "0" (low level) to "1" (high level), so that the clock signal CLK2 (=CLK1·CPS1) is also switched from "0" (low level) to "1" (high level), the step-up circuit 10 enters a step-up state where the switches SW1 and SW2 are turned OFF and the switches SW3 and SW4 are turned ON. As a result, the output voltage $V_{out}$ of the step-up circuit 10 approaches the target voltage $V_t$. In this case, however, since the load L is relatively large, the output voltage $V_{out}$ would not reach the target voltage $V_t$ even at time t3, so that the comparison output signal CPS1 of the comparator 23 still remains at "1" (high level).

Next, at time t3, when the clock signal CLK1 is switched from "1" (high level) to "0" (low level), the clock signal CLK2 is also switched from "1" (high level) to "0" (low level). Therefore, the step-up circuit 10 enters another stand-by state.

After time t4, a similar step-up state to that from time t2 to time t3 and a similar stand-by state to that from time t3 to time t4 are alternately repeated.

Figure 2:
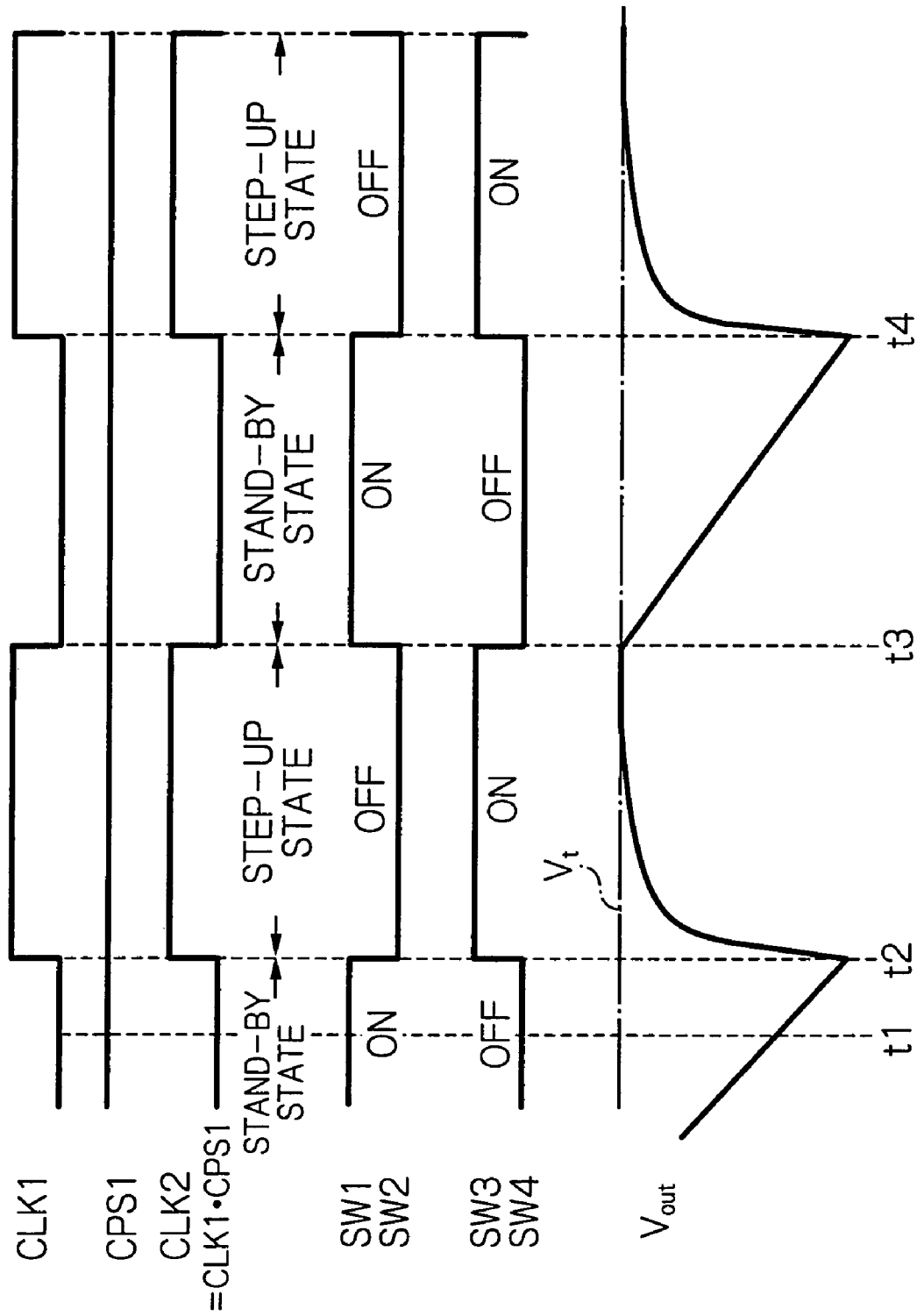
FIG. 2 is a timing diagram for explaining a first operation of the power supply apparatus of FIG. 1.

Thus, there is no problem in the first operation as shown in FIG. 2.

A second operation of the power supply apparatus of FIG. 1 is explained next with reference to FIG. 3 where the load L to which the output voltage $V_{out}$ is applied is relatively small and the response characteristics of the comparator 23 are relatively high.

First, at time t1, the clock signal CLK1 is low so that the clock signal CLK2 is also low. Therefore, the step-up circuit 10 is in a stand-by state where the switches SW1 and SW2 are turned ON and the switches SW3 and SW4 are turned OFF.

Next, at time t2, since $V_{out} > V_t$, the comparison output signal CPS1 of the comparator 23 is "1" (high level), so that CLK2=CLK1. Therefore, when the clock signal CLK1 is switched from "0" (low level) to "1" (high level), so that the clock signal CLK2 (=CLK1·CPS1) is also switched from "0" (low level) to "1" (high level), the step-up circuit 10 enters a step-up state where the switches SW1 and SW2 are turned OFF and the switches SW3 and SW4 are turned ON. As a result, the output voltage $V_{out}$ of the step-up circuit 10 approaches the target voltage $V_t$. In this case, however, since the load L is relatively small, the output voltage $V_{out}$ would quickly reach the target voltage $V_t$ at times t21, t22, . . . . In addition, since the response characteristics of the comparator 23 are relatively high, the comparison output signal CPS1 of the comparator 23 would be quickly reversed. Therefore, step-up states and stand-by states are alternately and quickly repeated until time t3 when the clock signal CLK1 becomes "0" (low level).

Next, at time t3, when the clock signal CLK1 is switched from "1" (high level) to "0" (low level), the clock signal CLK2 is also switched from "1" (high level) to "0" (low level). Therefore, the step-up circuit 10 enters another stand-by state.

After time t4, similar step-up/stand-by states to those from time t2 to time t3 and a similar stand-by state to that from time t3 to time t4 are alternately repeated.

In the second operation as shown in FIG. 3, however, since the clock signal CLK2 repeats "0" (low level) and "1" (high level) very frequently when the clock signal CLK1 is "1" (high level), the power consumption would be remarkably increased.

A third operation of the power supply apparatus of FIG. 1 is explained next with reference to FIG. 4 where the load L to which the output voltage $V_{out}$ is applied is relatively small and the response characteristics of the comparator 23 are relatively low.

First, at time t1, the clock signal CLK1 is low so that the clock signal CLK2 is also low. Therefore, the step-up circuit 10 is in a stand-by state where the switches SW1 and SW2 are turned ON and the switches SW3 and SW4 are turned OFF.

Next, at time t2, since $V_{out} > V_t$, the comparison output signal CPS1 of the comparator 23 is "1" (high level), so that CLK2=CLK1. Therefore, when the clock signal CLK1 is switched from "0" (low level) to "1" (high level), so that the clock signal CLK2 (=CLK1·CPS1) is also switched from "0" (low level) to "1" (high level), the step-up circuit 10 enters a step-up state where the switches SW1 and SW2 are turned OFF and the switches SW3 and SW4 are turned ON. As a result, the output voltage $V_{out}$ of the step-up circuit 10 approaches the target voltage $V_t$. In this case, however, since the load L is relatively small, the output voltage $V_{out}$ would quickly reach the target voltage $V_t$ at times t31, t32, . . . . On the other hand, since the response characteristics of the comparator 23 are relatively low, the comparison output signal CPS1 of the comparator 23 would be slowly reversed. Therefore, step-up states and stand-by states are alternately and slowly repeated to have a large amplitude output voltage until time t3 when the clock signal CLK1 becomes "0" (low level).

Next, at time t3, when the clock signal CLK1 is switched from "1" (high level) to "0" (low level), the clock signal CLK2 is also switched from "1" (high level) to "0" (low level). Therefore, the step-up circuit 10 enters another stand-by state.

After time t4, similar step-up/stand-by states to those from time t2 to time t3 and a similar stand-by state to that from time t3 to time t4 are alternately repeated.

In the third operation as shown in FIG. 4, the comparator 23 can be a hysteresis-type comparator with relatively high response characteristics.

In the third operation as shown in FIG. 4, however, a time period from time t31 to time t32 or the like is large enough to generate large overshoots OS, which would remarkably increase the output voltage $V_{out}$ of the step-up circuit 10. At worst, when the output voltage $V_{out}$ exceeds a rated value, the elements within the power supply apparatus of FIG. 1 would deteriorate. Simultaneously, the ripple of the output voltage $V_{out}$ would be increased.

In FIG. 5, which illustrates an embodiment of the power supply apparatus according to the present invention, the step-up circuit 10 and the regulator 20 of FIG. 1 are changed to a step-up circuit 10' and a regulator 20', respectively.

In the step-up circuit 10', the switch SW4 of FIG. 1 is replaced by a switch SW4a as a discharging switching element controlled by a clock signal CLK3 and a switch SW4b as a discharging switching element associated with a resistor R3 controlled by a clock signal CLK4.

In the regulator 20', the voltage divider 21 of FIG. 1 is replaced by a voltage divider 21', a comparator 25, and gate circuits 26 and 27 are added to the elements of FIG. 1.

In the voltage divider 21', $$R1 = R1a + R1b$$

Therefore, the voltage divider 21' generates a divided voltage $V_{d2}$ of the output voltage $V_{out}$ of the step-up circuit 10' in addition to the divided voltage $V_{d1}$. In this case, the divided voltage $V_{d2}$ is represented by $$V_{d2} = V_{out} \cdot (R2 + R1b)/(R1 + R2) > V_{d1}$$

The comparator 25 compares the divided voltage $V_{d2}$ with the reference voltage $V_{ref}$ to generate a comparison output signal CPS2. Here, assume that a selection voltage for selecting the switches SW4a and SW4b is $V_S$ represented by $$V_s = V_{ref} \cdot (R1 + R2)/(R2 + R1b) < V_t$$

Then, the selection voltage $V_s$ can be set by adjusting one or more of the reference voltage $V_{ref}$ and the resistors R1a, R1b and R2.

In other words, the comparator 25 substantially compares the output voltage $V_{out}$ of the step-up circuit 10' with the selection voltage $V_s$ to generate the comparison output signal CPS2. That is, if $V_{out} \leq V_s$, CPS2="1" (high level). On the other hand, if $V_{out} > V_s$, CPS2="0" (low level).

The gate circuit 26 passes the clock signal CLK2 therethrough as the clock signal CLK3 in accordance with the comparison output signal CPS2. That is, $$CLK3 = CLK2 \cdot CPS2.$$

The gate circuit 27 passes the clock signal CLK2 therethrough as the clock signal CLK4 in accordance with the comparison output signal /CPS2. That is, $$CLK4 = CLK2 \cdot /CPS2.$$

In the charge pump circuit 10', the set of the switches SW1 and SW2 and the set of the switches SW3, SW4a and SW4b are complementarily turned ON and OFF by the clock signal CLK2. That is, in a stand-by state where CLK2="0" (low level), the switches SW1 and SW2 are turned ON while the switches SW3, SW4a and SW4b are turned OFF, so that the step-up capacitor C1 is charged by a power supply voltage $V_{DD}$. On the other hand, in a fast step-up state where CLK2="1" (high level), CLK3="1" (high level) and CLK4="0" (low level), the switches SW1, SW2 and SW4b are turned OFF while the switches SW3 and SW4a are turned ON, so that the power supply voltage $V_{DD}$ is superposed onto the charged voltage of the step-up capacitor C1 at a small time constant determined by the ON-resistance of the switch SW4a and the capacitance of the smoothing capacitor C2. Also, in a slow step-up state where CLK2="1" (high level), CLK3="0" (low level) and CLK4="1" (high level), the switches SW1, SW2 and SW4a are turned OFF while the switches SW3 and SW4b are turned ON, so that the power supply voltage $V_{DD}$ is superposed onto the charged voltage of the step-up capacitor C1 at a large time constant determined by the ON-resistance of the switch SW4b, the resistance of the resistor R3 and the capacitance of the smoothing capacitor C2. Thus, the stand-by state and the fast and slow step-up states are alternately repeated, so that a voltage at the smoothing capacitor C2 becomes higher than the power supply voltage $V_{DD}$.

Figure 6:
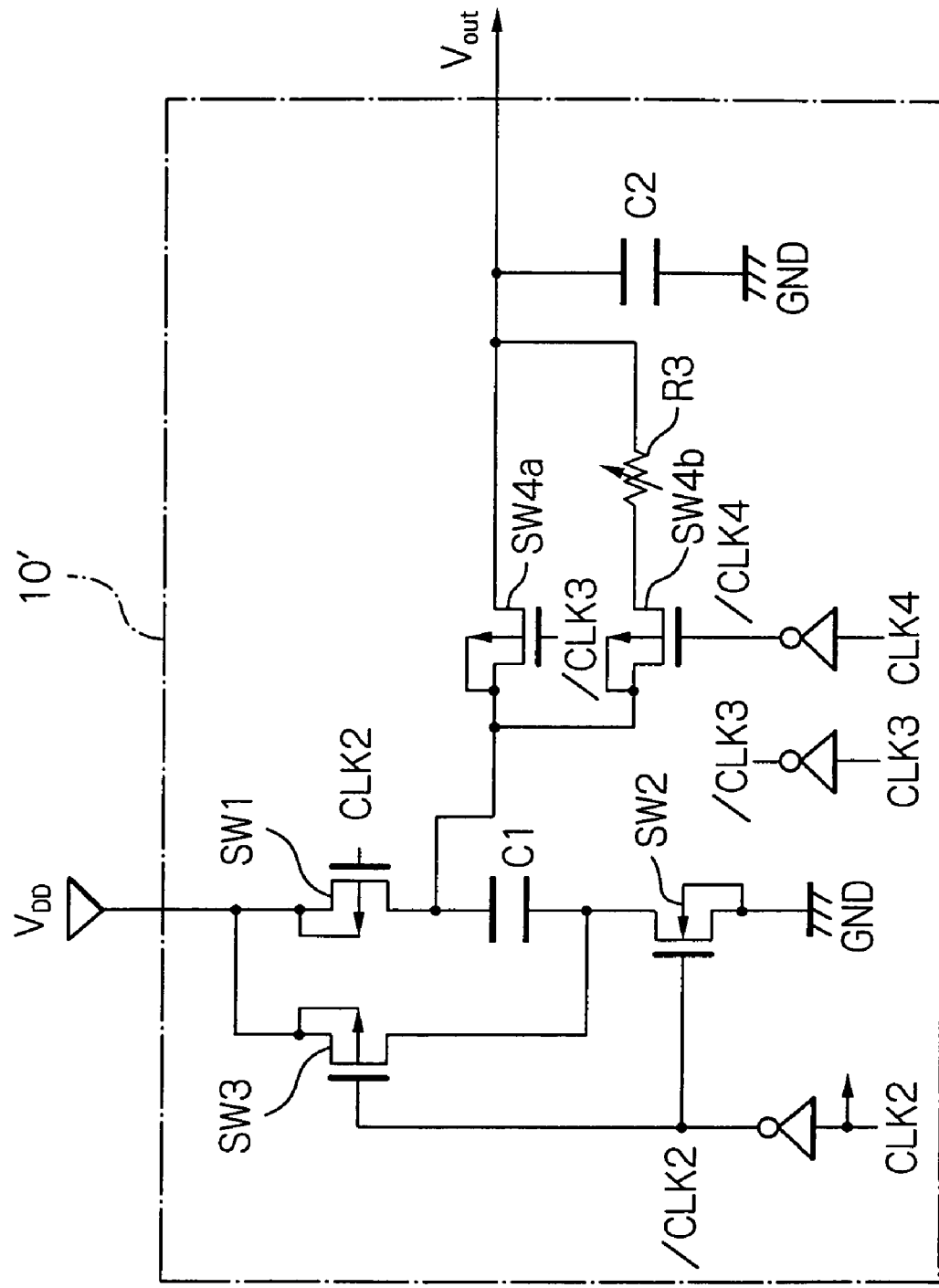
FIG. 6 is a detailed circuit diagram of an example of the step-up circuit of FIG. 5.

In FIG. 6, which illustrates a detailed circuit diagram of the step-up circuit 10' of FIG. 5, the switch SW1 is formed by a p-channel MOS transistor whose gate is controlled by the clock signal CLK2, the switch SW2 is formed by an n-channel MOS transistor whose gate is controlled by an inverted signal /CLK2 of the clock signal CLK2, the switch SW3 is formed by a p-channel MOS transistor whose gate is controlled by the signal /CLK2, the switch SW4a is formed by a p-channel MOS transistor whose gate is controlled by an inverted signal /CLK3 of the clock signal CLK3 and the switch SW4b is formed by a p-channel MOS transistor whose gate is controlled by an inverted signal /CLK4 of the clock signal CLK4.

In FIG. 6, the resistor R3 can be a variable resistor. For example, the resistor R3 is constructed by an n-channel depletion-type MOS transistor whose gate is grounded. Alternatively, the resistor R3 can be variable in accordance with the difference between the target voltage $V_t$ and the output voltage $V_{out}$.

A first operation of the power supply apparatus of FIG. 5 is explained next with reference to FIG. 7 where the load L to which the output voltage $V_{out}$ is applied relatively large.

First, at time t1, the clock signal CLK1 is low so that the clock signal CLK2 is also low. Therefore, the step-up circuit 10' is in a stand-by state where the switches SW1 and SW2 are turned ON and the switches SW3, SW4a and SW4b are turned OFF.

Next, at time t2, since $V_{out} < V_s < V_t$, the comparison output signals CPS1 and CPS2 of the comparators 23 and 25a are both "1" (high level). Therefore, when the clock signal CLK1 is switched from "0" (low level) to "1" (high level), the clock signal CLK2 (=CLK1·CPS1) is switched from "0" (low level) to "1" (high level). Also, the clock signal CLK3 (=CLK2·CPS2) is switched from "0" (low level) to "1" (high level) while the clock signal CLK4 (=CLK2·/CPS2) remains at "0" (low level). Therefore, the step-up circuit 10' enters a fast step-up state where the switches SW1, SW2 and SW4b are turned OFF and the switches SW3 and SW4a are turned ON. As a result, the output voltage $V_{out}$ of the step-up circuit 10' increases to the selection voltage $V_s$.

At time t41, when the output voltage $V_{out}$ of the step-up circuit 10' crosses the selection voltage $V_s$, the comparison output signal CPS2 of the comparator 25 is switched from "1" (high level) to "0" (low level), so that the clock signal CLK3 (=CLK2·CPS2) is switched from "1" (high level) to "0" (low level) while the clock signal CLK4 (=CLK2·/CPS2) is switched from "0" (low level) to "1" (high level). Therefore, the step-up circuit 10' enters a slow step-up state where the switches SW1, SW2 and SW4a are turned OFF and the switches SW3 and SW4b are turned ON. As a result, the output voltage $V_{out}$ of the step-up circuit 10' approaches the target voltage $V_t$. Additionally, since the load L is relatively large, the output voltage $V_{out}$ would not reach the target voltage $V_t$ even at time t3, so that the comparison output signal CPS1 of the comparator 23 still remains at "1" (high level).

Next, at time t3, when the clock signal CLK1 is switched from "1" (high level) to "0" (low level), the clock signal CLK2 is also switched from "1" (high level) to "0" (low level). Therefore, the step-up circuit 10' enters another stand-by state.

After time t4, similar fast and slow step-up states to those from time t2 to time t3 and a similar stand-by state to that from time t3 to time t4 are alternately repeated.

Figure 7:
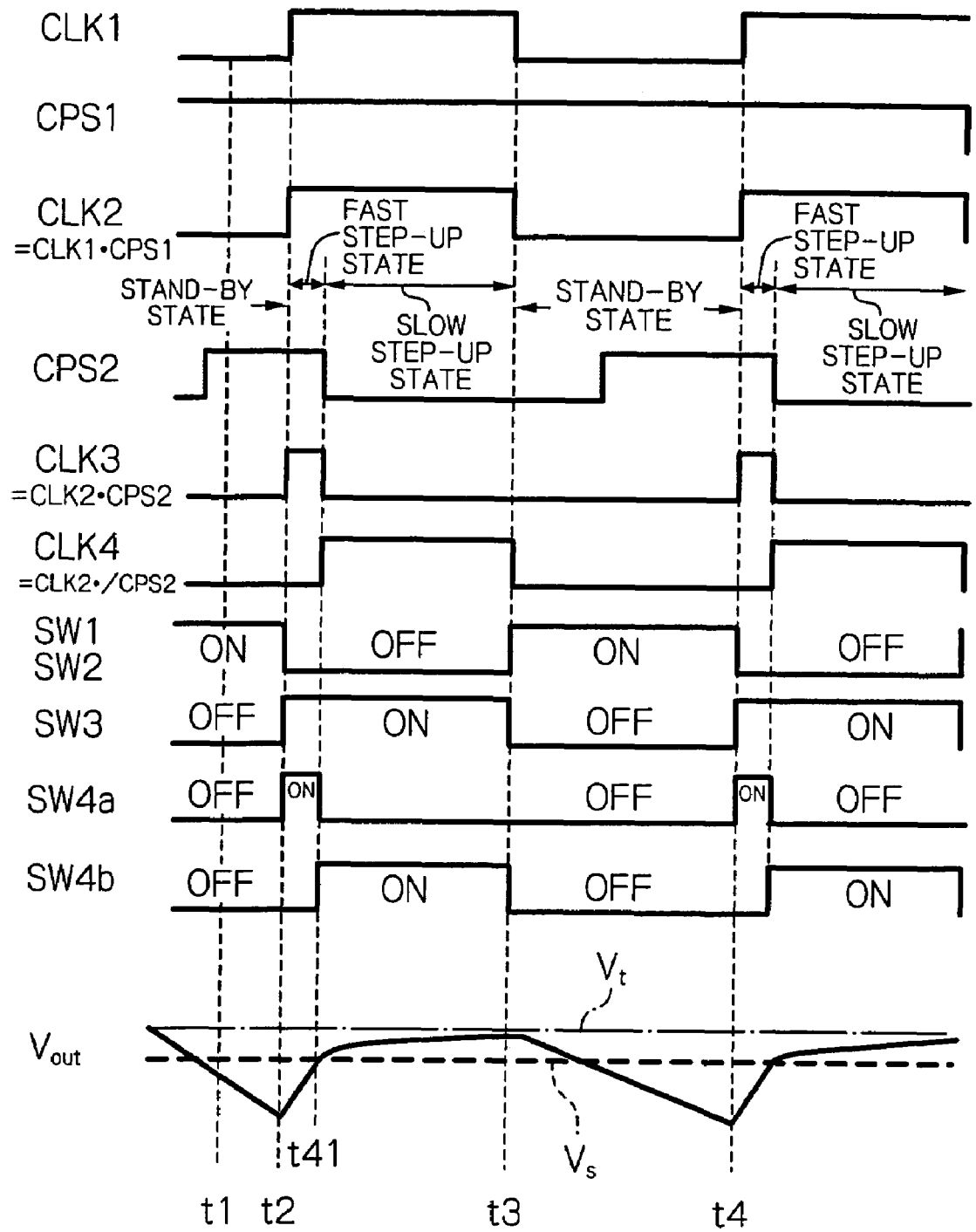
FIG. 7 is a timing diagram for explaining a first operation of the power supply apparatus of FIG. 5.

Thus, there is no problem in the first operation as shown in FIG. 7.

A second operation of the power supply apparatus of FIG. 5 is explained next with reference to FIG. 8 where the load L to which the output voltage $V_{out}$ is applied is relatively small and the response characteristics of the comparator 23 are relatively high.

First, at time t1, the clock signal CLK1 is low so that the clock signal CLK2 is also low. Therefore, the step-up circuit 10' is in a stand-by state where the switches SW1 and SW2 are turned ON and the switches SW3, SW4a and SW4b are turned OFF.

Next, at time t2, since $V_{out} < V_s < V_t$, the comparison output signals CPS1 and CPS2 of the comparators 23 and 25a are both "1" (high level). Therefore, when the clock signal CLK1 is switched from "0" (low level) to "1" (high level), the clock signal CLK2 (=CLK1·CPS1) is switched from "0" (low level) to "1" (high level). Also, the clock signal CLK3 (=CLK2·CPS2) is switched from "0" (low level) to "1" (high level) while the clock signal CLK4 (=CLK2·/CPS2) remains at "0" (low level). Therefore, the step-up circuit 10' enters a fast step-up state where the switches SW1, SW2 and SW4b are turned OFF and the switches SW3 and SW4a are turned ON. As a result, the output voltage $V_{out}$ of the step-up circuit 10' increases to the selection voltage $V_s$.

At time t51, when the output voltage $V_{out}$ of the step-up circuit 10' crosses the selection voltage $V_s$, the comparison output signal CPS2 of the comparator 25 is switched from "1" (high level) to "0" (low level), so that the clock signal CLK3 (=CLK2·CPS2) is switched from "1" (high level) to "0" (low level) while the clock signal CLK4 (=CLK2·/CPS2) is switched from "0" (low level) to "1" (high level). Therefore, the step-up circuit 10' enters a slow step-up state where the switches SW1, SW2 and SW4a are turned OFF and the switches SW3 and SW4b are turned ON. In this case, since the load L is relatively small, the output voltage $V_{out}$ would relatively slowly reach the target voltage $V_t$ at time t52 before at time t3. Between time t52 to time t3, since the response characteristics of the comparator 23 are relatively high, the comparison output signal CPS1 of the comparator 23 would be quickly reversed. Therefore, step-up states and stand-by states are alternately and quickly repeated to have a small amplitude of the output voltage $V_{out}$ until time t3 when the clock signal CLK1 becomes "0" (low level).

Next, at time t3, when the clock signal CLK1 is switched from "1" (high level) to "0" (low level), the clock signal CLK2 is also switched from "1" (high level) to "0" (low level). Therefore, the step-up circuit 10' enters another stand-by state.

After time t4, similar fast and slow step-up/stand-by states to those from time t2 to time t3 and a similar stand-by state to that from time t3 to time t4 are alternately repeated.

Figure 8:
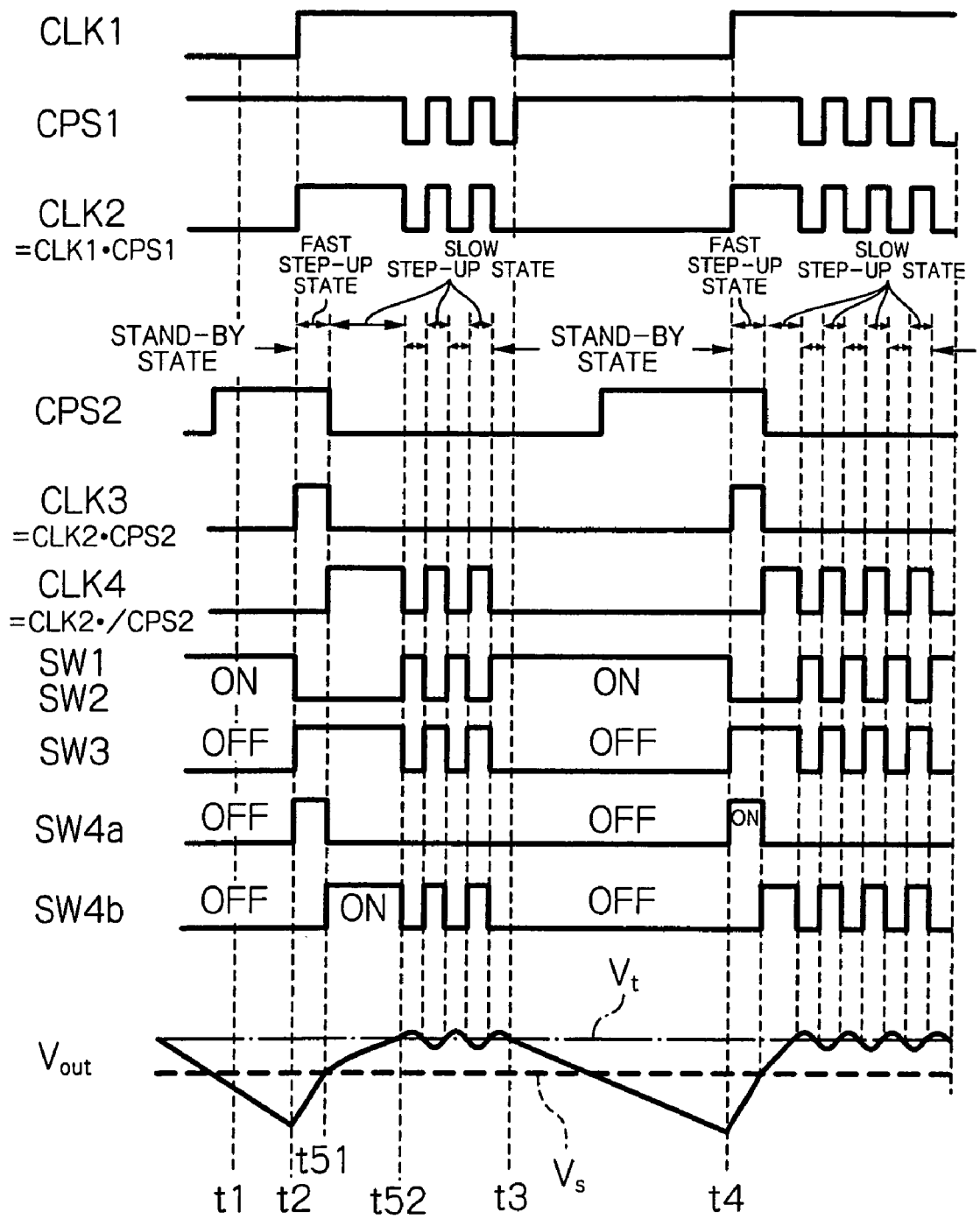
FIG. 8 is a timing diagram for explaining a second operation of the power supply apparatus of FIG. 5.

In the second operation as shown in FIG. 8, since the clock signal CLK2 repeats "0" (low level) and "1" (high level) relatively slowly when the clock signal CLK1 is "1" (high level), the power consumption would be decreased as compared with the second operation as illustrated in FIG. 3.

A third operation of the power supply apparatus of FIG. 5 is explained next with reference to FIG. 9 where the load L to which the output voltage $V_{out}$ is applied is relatively small and the response characteristics of the comparator 23 are relatively low.

First, at time t1, the clock signal CLK1 is low so that the clock signal CLK2 is also low. Therefore, the step-up circuit 10' is in a stand-by state where the switches SW1 and SW2 are turned ON and the switches SW3, SW4a and SW4b are turned OFF.

Next, at time t2, since $V_{out} < V_s < V_t$, the comparison output signals CPS1 and CPS2 of the comparators 23 and 25a are both "1" (high level). Therefore, when the clock signal CLK1 is switched from "0" (low level) to "1" (high level), the clock signal CLK2 (=CLK1·CPS1) is switched from "0" (low level) to "1" (high level). Also, the clock signal CLK3 (=CLK2·CPS2) is switched from "0" (low level) to "1" (high level) while the clock signal CLK4 (=CLK2·/CPS2) remains at "0" (low level). Therefore, the step-up circuit 10' enters a fast step-up state where the switches SW1, SW2 and SW4b are turned OFF and the switches SW3 and SW4a are turned ON. As a result, the output voltage $V_{out}$ of the step-up circuit 10' increases to the selection voltage $V_s$.

At time t61, when the output voltage $V_{out}$ of the step-up circuit 10' crosses the selection voltage $V_s$, the comparison output signal CPS2 of the comparator 25 is switched from "1" (high level) to "0" (low level), so that the clock signal CLK3 (=CLK2·CPS2) is switched from "1" (high level) to "0" (low level) while the clock signal CLK4 (=CLK2·/CPS2) is switched from "0" (low level) to "1" (high level). Therefore, the step-up circuit 10' enters a slow step-up state where the switches SW1, SW2 and SW4a are turned OFF and the switches SW3 and SW4b are turned ON. In this case, however, although the response characteristics of the comparator 23 are relatively low, since the load L is relatively small, the output voltage $V_{out}$ of the step-up circuit 10' approaches the target voltage $V_t$. Thus, the output voltage $V_{out}$ would relatively slowly reach the target voltage $V_t$ at time t62 before at time t3. At time t63, the step-up circuit 10' enters another stand-by state which continues for just a small period. Therefore, the comparison output signal CPS1 of the comparator 23 would be also slowly reversed with small period stand-by states. Therefore, fast and slow step-up states and stand-by states are alternately and slowly repeated to have a small amplitude of the output voltage $V_{out}$ of the step-up circuit 10' until time t3 when the clock signal CLK1 becomes "0" (low level).

Next, at time t3, when the clock signal CLK1 is switched from "1" (high level) to "0" (low level), the clock signal CLK2 is also switched from "1" (high level) to "0" (low level). Therefore, the step-up circuit 10' enters another stand-by state.

After time t4, similar fast and slow step-up/stand-by states to those from time t2 to time t3 and a similar stand-by state to that from time t3 to time t4 are alternately repeated.

Figure 9:
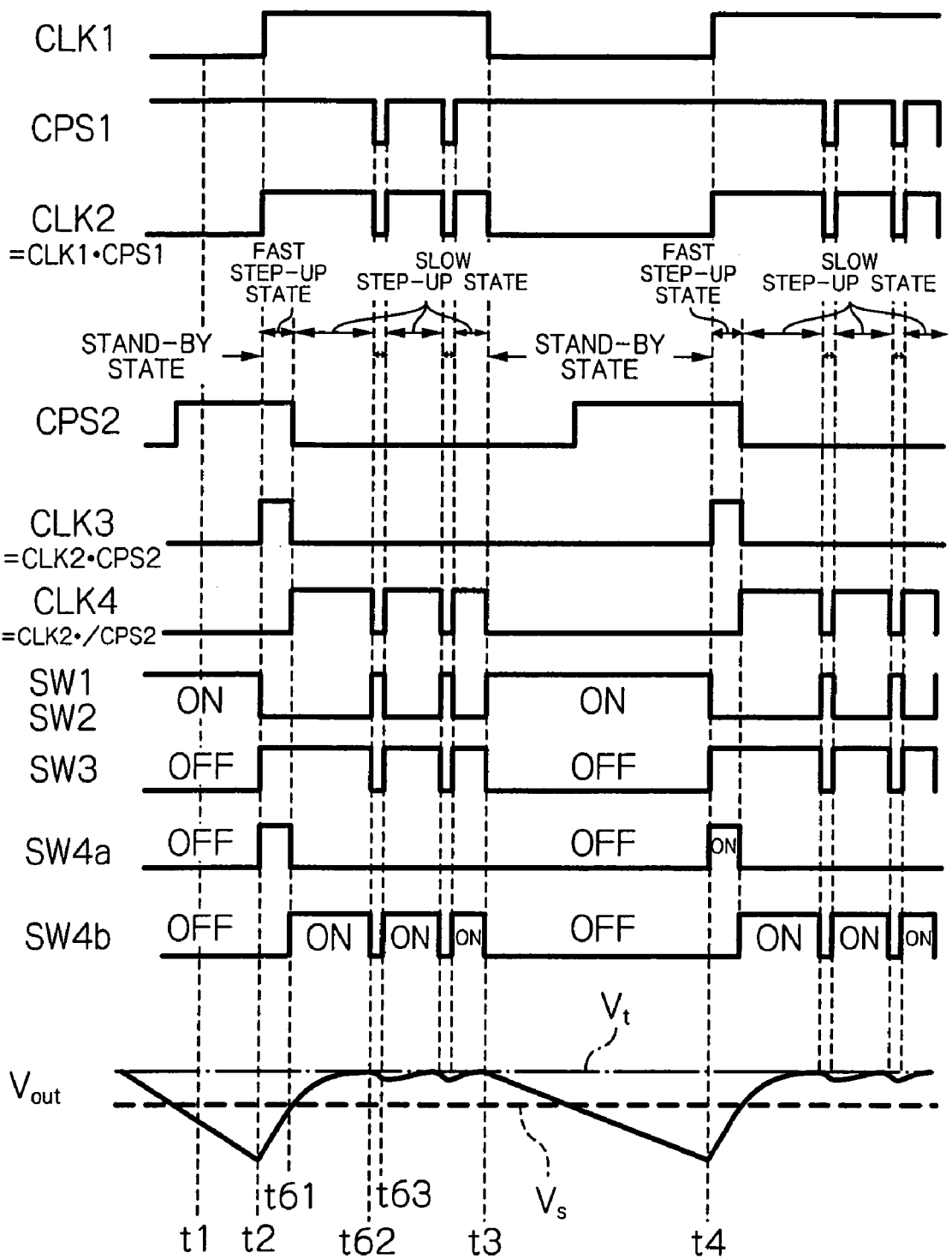
FIG. 9 is a timing diagram for explaining a third operation of the power supply apparatus of FIG. 1.

In the third operation as shown in FIG. 9, the output voltage $V_{out}$ of the step-up circuit is not so small as to generate small overshoots, which would remarkably decrease the output voltage $V_{out}$ of the step-up circuit 10. Thus, since the output voltage $V_{out}$ hardly exceeds a rated value, the elements within the power supply apparatus of FIG. 5 would not deteriorate. Simultaneously, the ripple of the output voltage $V_{out}$ would be decreased.

Also, in the third operation as shown in FIG. 9, since the clock signal CLK2 repeats "0" (low level) and "1" (high level)

relatively slowly when the clock signal CLK1 is "1" (high level), the power consumption would be decreased as compared with the second operation as illustrated in FIG. 3.

Further, in the operation as shown in FIG. 9, assume that the delay time of the comparator 23 is 1 μsec. In this case, the overshoot value is 0.1V/μsec. Contrary to this, in the prior art third operation as shown in FIG. 4, the over shoot value is 0.5V/μsec under the same condition that the delay time of the comparator 23 is 1 μsec. Thus, the overshoot value can be decreased.

In FIG. 5, the comparators 23 and 25 can be hysteresis-type comparators.

The invention claimed is:

1. A power supply apparatus comprising:
   a charge-pump type step-up circuit adapted to charge a step-up capacitor by a power supply voltage, step up a charged voltage of said step-up capacitor using a charge-pump operation, and discharge a stepped-up voltage to a smoothing capacitor via parallel first switch and second switch between the step-up capacitor and the smoothing capacitor, a resistor being connected in series between one of the first and second switches and the smoothing capacitor; and
   a regulator having a first comparator adapted to compare a voltage corresponding to an output voltage of said step-up circuit with a reference voltage to generate a first comparison output signal and skip a clock signal in accordance with said first comparison output signal, so that the output voltage of said step-up circuit is brought close to a target voltage,
   discharging of said smoothing capacitor being carried out through the resistor with a predetermined time constant when the output voltage of said step-up circuit is between said target voltage and a voltage lower than said target voltage by a predetermined value.

2. The power supply apparatus as set forth in claim 1, wherein,
   said first switch being turned ON to discharge the charge of said step-up capacitor to said smoothing capacitor when the output voltage of said step-up circuit is below the voltage lower than said target voltage by said predetermined value,
   said second switch being turned ON to discharge the charge of said step-up capacitor to said smoothing capacitor when the output voltage of said step-up circuit is between said target voltage and the voltage lower than said target voltage by said predetermined value.

3. The power supply apparatus as set forth in claim 2, wherein said regulator comprises a second comparator adapted to detect the voltage lower than said target voltage by said predetermined value, so that said first and second switches are controlled by a second comparison output signal of said second comparator.

4. A power supply apparatus comprising:
   a step-up capacitor;
   a smoothing capacitor to which is applied a stepped-up voltage stepped up from a power supply voltage by a charge pump operation using said step-up capacitor;
   a variable resistor provided at a discharging path of said stepped-up voltage from said step-up capacitor to said smoothing capacitor; and
   a parallel first switch and second switch between the step-up capacitor and the smoothing capacitor, the parallel resistor being connected in series between one of the first and second switches and the smoothing capacitor.

5. The power supply apparatus as set forth in claim 4, wherein said variable resistor is controlled in accordance with a difference between an output voltage of said apparatus and a target voltage.

6. A power supply apparatus comprising:
   a first power supply terminal;
   a second power supply terminal whose voltage is supposed to be lower than that of said first power supply terminal;
   an output terminal;
   a step-up circuit including a step-up capacitor with first and second ends, a smoothing capacitor with first and second ends connected to said output terminal and said second power supply terminal, respectively, a first charging switching element connected between said first power supply terminal and the first end of said step-up capacitor, a second charging switching element connected between the second end of said step-up capacitor and said second power supply terminal, a first discharging switching element connected between said first power supply terminal and the second end of said step-up capacitor, a second discharging switching element connected between the first end of said step-up capacitor and the first end of said smoothing capacitor, and a third discharging switching element along with a resistor connected in series thereto connected between the first end of said step-up capacitor and the first end of said smoothing capacitor; and
   a regulator connected to said output terminal and adapted to receive a first clock signal, said regulator including a first comparator for comparing an output voltage at said output terminal with a target voltage to generate a first comparison output signal, a second comparator for comparing the output voltage at said output terminal with a selection voltage lower than said target voltage to generate a second comparison output signal, a first gate circuit for passing said first clock signal as a second clock signal in accordance with said first comparison output signal, a second gate circuit for passing said second clock signal as a third clock signal in accordance with said second comparison output signal, and a third gate circuit for passing said second clock signal as a fourth clock signal in accordance with an inverted signal of said second comparison output signal,
   said second clock signal being supplied to said first and second charging switching elements and said first discharging switching element, said third clock signal being supplied to said second discharging switching element, said fourth clock signal being supplied to said third discharging switching elements,
   a charging operation being performed upon said step-up capacitor by said first and second charging switching elements when said second clock signal indicates a stand-by state,
   a fast discharging operation from said step-up capacitor to said smoothing capacitor being carried out by said first and second discharging switching elements when said third clock signal indicates that the output voltage at said output terminal is lower than said selection signal,
   a slow discharging operation from said step-up capacitor to said smoothing capacitor being carried out by said first and third discharging switching elements along with said resistor when said fourth clock signal indicates that the output voltage at said output terminal is between said target voltage and said selection signal.

7. The power supply apparatus as set forth in claim 6, wherein said regulator further comprises a voltage divider adapted to generate first and second divided voltages between the output voltage at said output terminal and a voltage at said second power supply terminal, said first divided voltage being lower than said second divided voltage, said first comparator comparing the output voltage at said output terminal with said target voltage by comparing said first divided voltage with a reference voltage, said second comparator comparing the output voltage at said output terminal with said selection voltage by comparing said second divided voltage with said reference voltage.

8. The power supply apparatus as set forth in claim 6, wherein said resistor comprises a variable resistor.

9. The power supply apparatus as set forth in claim 8, wherein said variable resistor has a variable resistance varying in accordance with a difference between said target voltage and the output voltage at said output terminal.

10. The power supply apparatus as set forth in claim 9, wherein said variable resistor comprises an n-channel depletion type MOS transistor with a gate adapted to receive said target voltage and a source connected to said output terminal.

11. The power supply apparatus as set forth in claim 1, wherein the step-up circuit further comprises a third switch and a fourth switch arranged in parallel between the step-up capacitor and $V_{DD}$ such that one of the third switch and the fourth switch is connected between a first terminal of the step-up capacitor and $V_{DD}$ and the other of the third switch and the fourth switch is connected between a second terminal of the step-up capacitor and $V_{DD}$.

12. The power supply apparatus as set forth in claim 11, wherein a fifth switch is connected between the step-up capacitor and GND.

13. The power supply apparatus as set forth in claim 4, wherein further comprising a third switch and a fourth switch arranged in parallel between the step-up capacitor and $V_{DD}$ such that one of the third switch and the fourth switch is connected between a first terminal of the step-up capacitor and $V_{DD}$ and the other of the third switch and the fourth switch is connected between a second terminal of the step-up capacitor and $V_{DD}$.

14. The power supply apparatus as set forth in claim 13, wherein a fifth switch is connected between the step-up capacitor and GND.

* * * * *